Oct. 21, 1958
J. GARDEN, JR
2,856,817
ADJUSTABLE MIRROR ASSEMBLY
Filed June 22, 1956
2 Sheets-Sheet 1
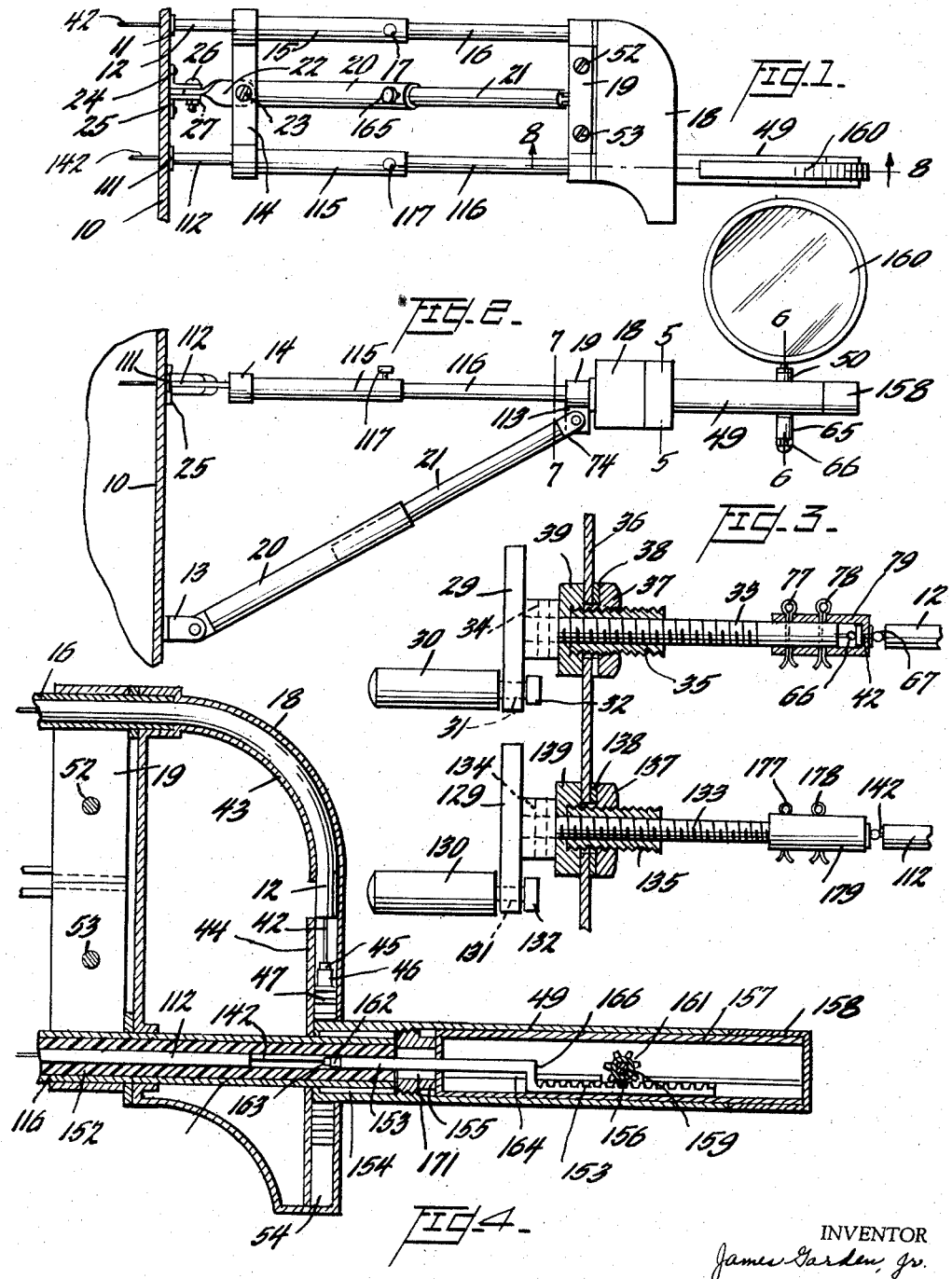
INVENTOR
James Garden, Jr.
BY Watson, Cole, Grindle & Watson
ATTORNEY

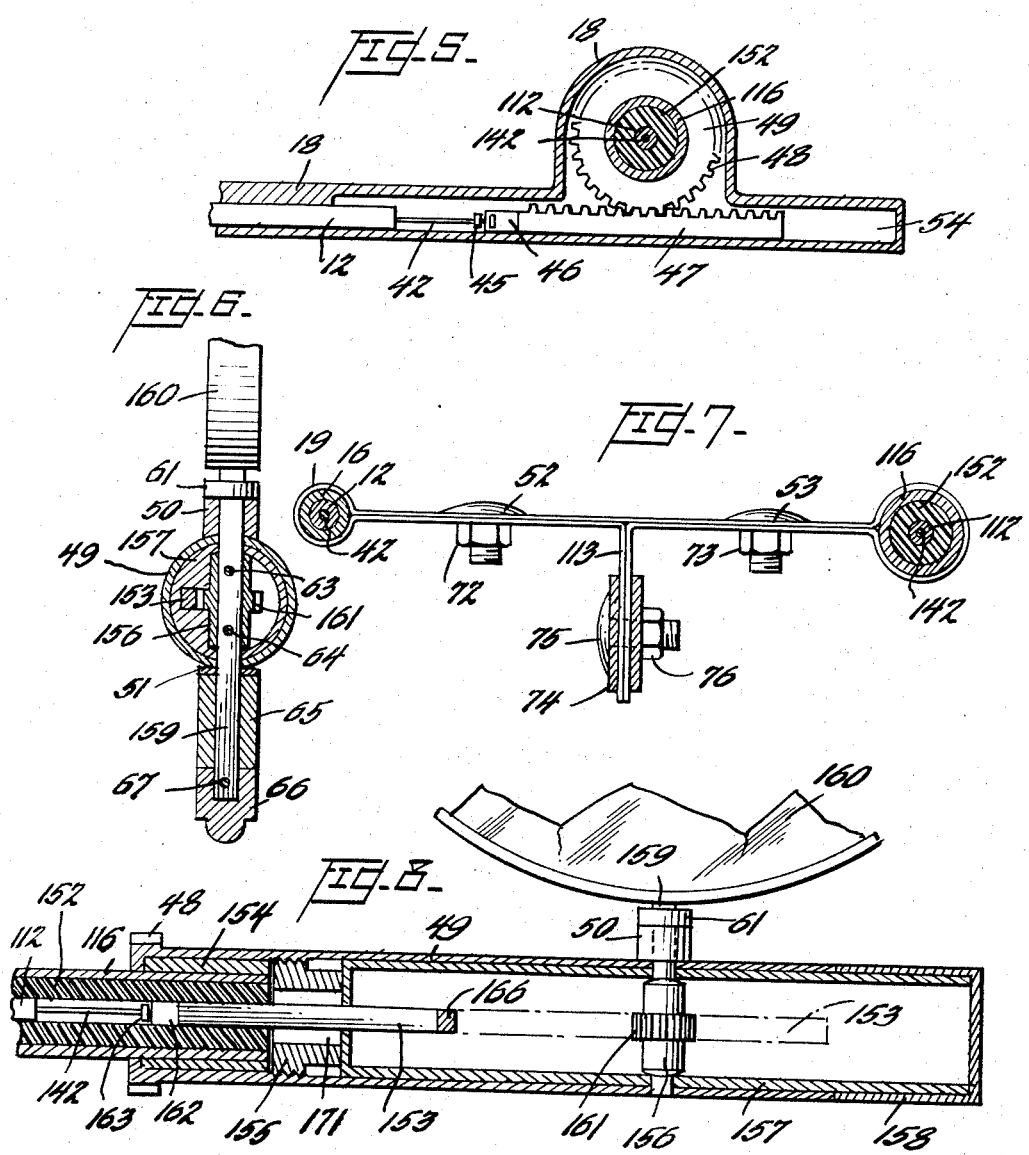

United States Patent Office 2,856,817
Patented Oct. 21, 1958

2,856,817

ADJUSTABLE MIRROR ASSEMBLY

James Garden, Jr., Elizabeth, Pa.

Application June 22, 1956, Serial No. 593,204

2 Claims. (Cl. 88—98)

This invention relates to remotely adjustable rear view mirrors and particularly to rear view mirrors which are adapted for use on trucks, buses or the like. More specifically this invention contemplates a rear view mirror assembly featuring dual cable and rack and pinion assemblies together with telescoping supporting members whereby vertical and horizontal adjustment of an externally mounted rear view mirror may be brought about quickly and with a minimum of effort.

A principal object of the present invention is to provide a rear view mirror which may be tilted vertically or turned horizontally from within the driver's compartment by means of a simple control, while the driver maintains full control of the vehicle.

Another object of the present invention is to provide a rear view mirror which can be fixed in position until adjusted through positive movement of the adjusting mechanism.

Yet another object of the present invention is to provide a rear view mirror of the type indicated, wherein the major portion of the adjusting mechanism is simple, sturdy, completely enclosed for its protection and inexpensive to construct.

Still another object of the present invention is to provide a rear view mirror of the type indicated, to which a spotlight can be attached for illuminating the roadway.

Other objects, features, and advantages of the present invention will be apparent from the following description read in conjunction with the accompanying figures in which:

Figure 1 is a top plan view of the portion of the rear view mirror assembly mounted outside the vehicle;

Figure 2 is a side plan view of the portion of the rear view mirror assembly mounted outside the vehicle;

Figure 3 is a top plan view of the portion of the rear view mirror assembly mounted within the vehicle;

Figure 4 is an enlarged top view in longitudinal section of a portion of the assembly mounted outside the vehicle as shown in Figure 1;

Figure 5 is a vertical view taken along the lines 5—5 in Figure 2;

Figure 6 is a vertical view taken along the lines 6—6 in Figure 2;

Figure 7 is a vertical view taken along the lines 7—7 in Figure 2; and

Figure 8 is a vertical view taken along the lines 8—8 in Figure 1.

Stated broadly, the present invention comprises a side view mirror operatively connected by means of cables such as Bowden wires with two rack and pinion assemblies, the first of these assemblies constructed and arranged to effect vertical movement of said mirror and the second of these assemblies constructed and arranged to effect horizontal movement of said mirror. Various types of cable are suitable for the purposes of the invention, but Bowden wires are preferred.

Referring now to the figures in greater detail it will be immediately apparent that the assembly employed for horizontal adjustment and the assembly employed for vertical adjustment of the externally mounted mirror are structurally similar. Parallel reference numerals have, therefore, been applied wherever possible to similar elements. Thus, referring to Figures 1 and 2 there is shown at 10 the side of the truck or automobile to which this adjustable mirror assembly is attached. The chrome plated washers by means of which Bowden wire casing 12 and 112 are secured to the side of the truck or automobile 10 are indicated at 11 and 111. It will be readily apparent that circular chrome plated washers 11 and 111 are fastened to the truck body at the openings drilled for Bowden wires 42 and 142 and associated casings 12 and 112. The Bowden wire 42 accommodated in housing 12 is used for vertical adjustment, and the Bowden wire 142 accommodated in casing 112 is used for horizontal adjustment of the externally mounted mirror. In other words, shortening or lengthening the effective length of Bowden wire 42 causes the mirror to move about its horizontal axis whereas shortening or lengthening the effective length of Bowden wire 142 causes the mirror to move about its vertical axis.

As is shown best in Figure 1, the Bowden wire casings 12 and 112 pass through brace member 14 and thence into sleeve members 15 and 115. Brace member 14 is preferably constructed of heavy gauge metal. Sleeve members 15 and 115 in turn receive telescoping members 16 and 116 which may be fixed in position within the sleeves 15 and 115 by means of set screws 17 and 117, respectively. Passing through telescoping members 16 and 116 each Bowden wire and its associated casing is received by housing 18.

A brace member designated generally at 19 serves to support the telescoping members 16 and 116. The construction of brace member 19 is shown most clearly in Figure 7. Screw 52 and nut 72 hold telescoping member 16 in position, screw 53 and nut 73 hold telescoping member 116 in position, and screw 75 and nut 76 hold end member 74 of telescoping member 21 in position.

At 22 there is shown a supporting member which, as will be readily apparent, is secured to brace member 14 by screw 23. Supporting member 22 is twisted 90° to fit between brackets 24 and 25 to which it is secured by screw and nut 26 and 27. Screws 23 and 26 are preferably flat headed and cadmium coated.

It will be readily apparent that sleeve members 15 and 115 are secured to the side of the automobile 10 by means of brace member 14 and supporting member 22. It will also be evident that sleeve member 20 is secured to automobile side 10 by means of bracket 13 and that associated telescoping member 21 is secured to brace member 19 at 113.

The telescoping adjustment of the externally housed assembly is effected through sleeve members 15, 20, and 115 and their associated telescoping members 16, 21, and 116. Once the desired position has been found, set screws 17, 165, and 117 on the sleeve members and nuts and screws on support member 22 are tightened. Thereafter the mirror is adjusted from the cab of the truck or car by the use of the dashboard assembly which actuates the Bowden wires.

Figure 3 shows in detail the assembly housed within the car or the truck wall or dashboard whereby the Bowden wires passing through Bowden wire casings 12 and 112 may be moved in order to effect vertical and horizontal movement of the externally housed mirror. At 29 and 129 hand wheels are shown to which are attached handles 30 and 130. Handles 30 and 130 are constructed of relatively lightweight material, preferably aluminum so that their weight will not turn wheels 29 and 129. Because handles 30 and 130 are accommodated in apertures 31 and 131 and secured to hand wheels 29 and 129 by nuts 32 and 132, they are free to rotate on their own axes when the hand wheels are turned. The hand wheels 29 and 129 are fixedly secured to externally threaded shafts 33 and 133 by set screws 34 and 134, respectively. These externally threaded shafts are, in turn, mounted in internally threaded sleeve members 35 and 135. Internally threaded sleeves 35 and 135 are fixedly secured to the dashboard 36 by any conventional attaching means such as hexagonal nut 37 and 137, circular washers 38 and 138 and circular nuts 39 and 139. The terminal portions of externally threaded shafts 33 and 133 accommodate collars 79 and 179, the collars being attached to shafts 33 and 133 by cotter pins 77, 78, and 177, 178, respectively. Fixedly secured to collars 79 and 179 by any convenient means such as swivel members 66 and 67 are Bowden wires 42 and 142. By employing swivel members of this type, the Bowden wires are prevented from twisting during adjustment of the mirror. Externally threaded shafts 33 and 133 may be moved in and out of internally threaded sleeve members 35 and 135 thus causing the effective length of the Bowden wires 42 and 142 fixedly secured to collars 79 and 179 to be shortened or lengthened as desired.

The Bowden wire 42 and its casing 12 used for adjustment of the mirror about its horizontal axis and Bowden wire 142 and casing 112 used for adjustment of the mirror about its vertical axis are both received by housing 18 which is preferably constructed of a sturdy plastic. Heavy gauge metal member 19, disposed adjacent to housing 18, serves as a brace and spacer and anchors telescoping members 21, 16 and 116. Like screws 26 and 23, screws 52 and 53 are preferably flat headed.

Housing 18 encases the vital parts of the device and provides protection for the rack 47, pinion 48 and molded trough member 43. Figure 4 shows most clearly the arrangement of parts in housing 18, whereby vertical and horizontal adjustment of the externally mounted mirror is effected. Referring first to the arrangement whereby adjustment of the horizontal axis of the mirror is effected, the Bowden wire casing 12, containing the Bowden wire 42, is guided along the edge of the housing 18 by curved trough member 43 and ridge 44. By means of attaching members 45 and 46, the Bowden wire is fixedly secured to rack 47. A more detailed showing of this arrangement of parts is shown in Figure 5. The teeth of rack 47, in turn, engage the teeth of pinion 48, which, as will be apparent from both Figures 5 and 8, fits over and is bonded or otherwise secured to mirror suporting member 49. Thus, by the shortening or lengthening of the Bowden wire, the rack 47 is guided by ridge 44 through space 54 causing the mirror-supporting member 49 to be turned clockwise or counterclockwise on its longitudinal axis by means of pinion 48. Within hollow member 49 telescoping member 116 accommodates Bowden wire 142 and its casing 112. Mirror stem 159 is, in turn, attached to supporting member 49 by collar member 50 and round washer 51.

Referring now to the arrangement of the Bowden wire assembly within the housing 18 whereby adjustment about the vertical axis of the mirror is effected, Bowden wire 142 is accommodated within Bowden wire casing 112 and may optionally be cushioned from telescoping member 116 by plastic tube 152. Plastic tube or pipe 152 is shown tightly bonded to Bowden wire 142 within casing 116. A plastic tube or pipe of the type shown at 152 may be used with either or both Bowden wires 42 and 142. Bowden wire 142 is, in turn, fixedly secured to rack 153 which passes through threaded plug 155 and collar 154. Threaded plug 155 is bonded or otherwise secured to telescoping member 116. The mirror-supporting member 49 must be slipped on telescoping member 116 and pushed outwardly until it abuts threaded plug 155. Then collar 154 is secured by a special tool so that mirror-supporting tube 49 is securely fastened, yet can turn freely on its longitudinal axis.

A hexagonal hole 171 is provided in threaded plug 155 to receive a long hexagonal tool for adjustment purposes. The teeth of rack 153 mesh with the teeth 161 of round pinion 156. The rack 153 and pinion 156 assembly rest within the supporting and guiding member 157 and the entire assembly is closed by end number 158. Attaching member 162 is bonded or otherwise secured to rack 153 to permit Bowden wire 142 to slip when the mirror is rotated about its horizontal axis. In this way, twisting and eventual breaking of the wire is prevented. By means of the Bowden wire fastening means such as the stop collar designated at 163 working in conjunction with attaching member 162, rack 153 responds to pushing and pulling. Integral with guiding and supporting member 157 is ridge 164 which guides rack 153. End member 158 may be a tubular metal cap which is disposed over supporting and guiding member 157. Circular pinion 156 which meshes with rack 153 fits about the stem 159 of the mirror.

The structure of the column supporting the mirror 160 is comparatively simple as shown most clearly in Figure 6. Cross member 61 is integral with shaft 159 so that the mirror 160 may rest on collar member 50. Set screw 63 and 64 secure shaft 159 to circular pinion 156. At 51 are shown round washers which may optionally be added to the assembly to tighten the connection between mirror supporting member 49 and the mirror stem 159. The portion of stem 159 disposed below mirror supporting member 49 is preferably square in horizontal cross section instead of round as is that portion of the stem disposed above mirror-supporting shaft 49. This construction expedites the mounting of a spotlight below the mirror supporting member 49 to be used in conjunction with the mirror in illuminating the area behind the truck which the driver sees reflected in the mirror. It will be immediately apparent that adjustment of the mirror adjusts the spotlight. Collar 65 is secured by hexagonal nut 66 and set screw 67. Thus, by movement of the rack 153 the mirror stem 159 is moved by pinion 156 about its longitudinal axis.

In operation this adjustable rear view mirror assembly is keynoted by ease of operation and facility of handling. The externally mounted portion of the assembly is fixed in the desired position by means of set screws 17, 117 and 165. During operation of the car or truck the driver may find it desirable, because he approaches a new road at an odd angle or is driving upon a steep incline, to adjust the mirror both vertically and horizontally. Vertical adjustment is effected by the occupant of the car or truck cab by movement of handle 30 which is secured to hand wheel 29. Rotation of handle 30 causes the externally threaded shaft 33 to move inwardly or outwardly within internally threaded sleeve 35. In this way, the Bowden wire 42 which is secured to shaft 33 by means of collar 29 is effectively lengthened or shortened. The Bowden wire 42 housed within its casing 12 is guided through telescoping member 16 into housing 18 following curved trough member 43. By means of the swivel assembly indicated at 45 and 46 this Bowden wire is fixedly secured to rack 47 as shown most clearly in Figure 5. The shortening or lengthening of the Bowden wire causes the rack to move through the space indicated at 54 actuating pinion 48. Pinion 48 is secured to the mirror supporting member 49 and it will thus be immediately evident that member 49 is rotated about its horizontal axis by the movement of rack 48 through space 54. Since, as is illustrated most clearly in Figure 6, the mirror is secured to supporting member 49, movement of mirror supporting member 49 will cause the mirror itself to move about its horizontal axis. In this way, easy and rapid vertical adjustment of mirror 160 is effected. Horizontal adjustment of the mirror is also easily accomplished. Handle 130 is rotated, thus causing externally threaded shaft 133 to screw within internally threaded sleeve 135, thus effectively shortening or lengthening Bowden wire 142 which is swiveled to collar 179. Bowden wire 142 housed within casing 112 runs into the housing 118 and is operatively attached to rack 153 by means of the swivel assembly 162 and 163. By the shortening and lengthening of Bowden wire 142, rack 153 which is offset at 166 meshes with the teeth 161 of pinion 156. Since pinion 156 is bonded or otherwise attached to the stem of the mirror 159 the movement of Bowden wire 142 causes pinion 156 to move about its vertical axis, thus bringing about like movement of the mirror stem 159 and the mirror itself 160.

Thus, by this altogether simple but novel arrangement of Bowden wires, rack and pinions, the externally mounted mirror 160 can be remotely controlled both along its vertical and horizontal axes.

It will be readily understood that, though one embodiment of this invention has been described in great detail, changes and modifications can be resorted to without departing from the spirit of the invention or sacrificing any of the advantages.

Having thus described this invention, what is claimed as new and novel and desired to be secured by Letters Patent is:

1. An adjustable mirror assembly mountable on a vehicle body comprising a plurality of telescoping supporting members mountable on said body, a housing connected to one end of each of said members, a pair of cables, each enclosed in one of said supporting members, means for varying the effective length of said cables, a first rack and a first pinion mounted in said housing, the first of said cables fixedly secured to said first rack, a mirror supporting member fixedly secured to said first pinion, said mirror supporting member being rotatable on its longitudinal axis, a mirror stem disposed perpendicularly to said mirror supporting member and secured thereto, said mirror stem being rotatable on its longitudinal axis, a mirror fixedly secured to the end of said mirror stem, a second rack and a second pinion, the second of said cables being secured to said second rack, said second pinion engaging said second rack, said second pinion being disposed about and fixedly secured to said mirror stem, whereby varying the effective length of said first cable causes said mirror supporting member to rotate on its longitudinal axis and varying the length of said second cable causes said mirror stem to rotate on its longitudinal axis.

2. An adjustable mirror assembly in accordance with claim 1, wherein said mirror supporting member is a hollow shaft, said second pinion is disposed within said shaft and wherein at least a pair of said telescoping members are mounted substantially parallel to each other.

References Cited in the file of this patent
UNITED STATES PATENTS

| | | |
|---|---|---|
| 1,542,259 | Macy | June 16, 1925 |
| 1,907,577 | Potter | May 9, 1933 |
| 2,552,074 | Thompson | May 8, 1951 |
| 2,626,539 | Peterson | Jan. 27, 1953 |
| 2,696,142 | Langford | Dec. 7, 1954 |
| 2,717,531 | Schenck | Sept. 13, 1955 |
| 2,751,817 | Lapekas | June 26, 1956 |